United States Patent
Yaginuma et al.

(10) Patent No.: US 6,852,304 B2
(45) Date of Patent: Feb. 8, 2005

(54) FINE TUNGSTEN CARBIDE POWDER AND PROCESS FOR PRODUCING THE SAME

(75) Inventors: Hiroshi Yaginuma, Osaka (JP); Susumu Morita, Kobe (JP)

(73) Assignees: Mitsubishi Materials Corporation, Tokyo (JP); Japan New Metals Co., Ltd., Osaka (JP)

( * ) Notice: Subject to any disclaimer, the term of this patent is extended or adjusted under 35 U.S.C. 154(b) by 154 days.

(21) Appl. No.: 10/068,856

(22) Filed: Feb. 11, 2002

(65) Prior Publication Data

US 2003/0053947 A1 Mar. 20, 2003

(30) Foreign Application Priority Data

| Jul. 30, 2001 | (JP) | ................................. P2001-228805 |
| Aug. 2, 2001 | (JP) | ................................. P2001-234333 |
| Jan. 16, 2002 | (JP) | ................................. P2002-006948 |

(51) Int. Cl.$^7$ ............................................. C01B 31/34
(52) U.S. Cl. ..................................................... 423/440
(58) Field of Search ......................................... 423/440

(56) References Cited

U.S. PATENT DOCUMENTS

| 4,008,090 A | 2/1977 | Miyake et al. ............... 106/43 |
| 4,664,899 A | 5/1987 | Kimmel et al. |
| 5,110,565 A | 5/1992 | Weimer et al. ............ 422/198 |
| 5,380,688 A | 1/1995 | Dunmead et al. .......... 148/237 |
| 5,529,804 A | 6/1996 | Bonneau et al. ........... 427/217 |
| 5,885,372 A | 3/1999 | Seegopaul ................. 148/217 |

FOREIGN PATENT DOCUMENTS

| EP | 0 834 589 | 4/1998 |
| EP | 0 846 656 | 6/1998 |
| EP | 0 846 658 A1 | 6/1998 |
| JP | 49-042600 A1 | 4/1974 |
| JP | Sho 50-92899 | 7/1975 |
| JP | 50-127900 A1 | 10/1975 |
| JP | 61-124508 | 6/1986 |
| JP | 03-056607 | 3/1991 |
| JP | 10-259057 | 9/1998 |
| JP | 10-265811 | 10/1998 |
| JP | 2002-529360 A1 | 9/2002 |
| WO | WO91/07244 | 5/1991 |
| WO | WO93/02962 | 2/1993 |
| WO | WO95/04793 | 2/1996 |

OTHER PUBLICATIONS

European Search Report dated Nov. 11, 2002.
Database CA 'Online! Chemical Abstracts Service, Columbus, Ohio, US; Martorana, D. et al: "Preparations of ultrafine powders of tungsten carbide" retrived from STN Database accession No. 94:126235 CA XP002216767 "abstract" & Ceramica (Florence) (1980). 33(1), 1–6, 1980.
Database CA 'Online! Chemical Abstracts Service, Columbsu, Ohio, US; Akimoto, Yumi et al: "Micro–poweder of metal carbides" retrived from STN Database accession No. 84:137966 CA XP002216768 "abstract" & JP50 127900 A (Mitsubishi Metal Corp ., Japan) (Oct. 8, 1975).
Database WPI Section Ch. Week 197433 Derwent Publications Ltd., Londong, GB; AN 1974–59001V XP002216769 & JP 49 042600 A (Sumitomo Denki Kogyo Co), (Apr. 22, 1974)###"abstract".
Martorana et al., "Preparation of Ultra–Fine Powders of Tungsten Carbide," La Ceramica, Organo Ufficiale Della Federceramica, vol. 33, No. 1 (1980).

*Primary Examiner*—Stuart Hendrickson
(74) *Attorney, Agent, or Firm*—Rader, Fishman & Grauer PLLC

(57) ABSTRACT

A process is provided for producing a fine tungsten carbide powder, which comprises the steps of drying a slurry, which is obtained by mixing an aqueous ammonium tungstate solution with a carbon powder, at low temperature, to form a precursor, mixing a reduction and carburization product, which is obtained by reducing and oxidizing the precursor in an inert gas, with a carbon powder in a proportion required to substantially carburize the entire tungsten component into tungsten carbide (WC), and carburizing the mixture; and a high-performance fine tungsten carbide powder produced by the process, which has an average particle size of 0.8 $\mu$m or less and is free of a coarse power having a particle size of more than 1 $\mu$m, and which also contains less metal impurities and contains oxygen and nitrogen in a predetermined amount.

13 Claims, No Drawings

FINE TUNGSTEN CARBIDE POWDER AND PROCESS FOR PRODUCING THE SAME

BACKGROUND OF THE INVENTION

1. Field of the Invention

The present invention relates to a process for producing a fine tungsten carbide powder suited for producing a fine cemented carbide having a high strength, and to a high-performance fine tungsten carbide powder produced by the process.

2. Description of Related Art

It has been well known that various cutting tools and wear-resistant tools are generally made from a tungsten carbide-based cemented carbide (hereinafter referred to as a cemented carbide) having a high strength, and that a fine tungsten carbide powder having an average particle size of 0.8 $\mu$m or less is used as a raw powder in the production of these tools for the purpose of securing a high strength.

As a process for producing the fine tungsten carbide powder, for example, various processes have been suggested, including processes described in U.S. Pat. No. 4,008,090 and Japanese Unexamined Patent Application, First Publication No. Sho 50-92899.

Recently, weight reduction, size reduction, and thinning have strongly been required in cutting tools and wear-resistant tools, and the shapes thereof have become progressively diversified and complicated. Therefore, a higher strength has been required for the cemented carbides which constitute these tools.

BRIEF SUMMARY OF THE INVENTION

To develop a cemented carbide having a higher strength from the above points of view, the present inventors have focused research on a fine tungsten carbide powder used as a raw powder of a cemented carbide and have obtained the research results shown in the following (a) to (d).

(a) The process for producing a conventional fine tungsten carbide powder includes, for example, a process of adding a carbon powder to a tungsten oxide powder as a raw powder and milling the mixed powder, followed by milling, reduction, and further carburization, as disclosed in U.S. Pat. No. 4,008,090. In the case of milling using a ball mill, contamination by metal impurities such as iron, cobalt, nickel and chromium from stainless steel containers and cemented carbide balls cannot be avoided. As a result, it becomes impossible to maintain a high purity of 99.9% or higher and coarse WC particles are locally produced during the reduction and carburization by the influence of these metal impurities (when using a powder containing the coarse WC particles as a raw material, a reduction in strength is likely to be caused by the coarse WC particles as origins of fractures). Therefore, it is difficult to produce a high-performance fine tungsten carbide powder.

(b) As disclosed in Japanese Unexamined Patent Publication, First Publication No. Sho 50-92899, there is also suggested a process of carburizing a precursor, which is obtained by drying a mixture of an ammonium paratungstate and a cobalt salt, with a gas to obtain a composite powder of tungsten carbide and cobalt. According to this process, cobalt is likely to cause a sintering phenomenon during the carburization and coarse WC particles are likely to be locally produced. Furthermore, very fine cobalt particles (at nanometer level) are dispersed in tungsten carbide particles. In the case in which the cemented carbide is produced by using the fine cobalt dispersed tungsten carbide powder, the thermal conductivity is reduced. When using the resulting cemented carbide as a cutting tool, the strength of the edge portion is reduced at high temperatures during the use of the tool, thus causing breakage and chipping.

(c) According to a process for producing a fine tungsten carbide powder, which comprises mixing an aqueous solution of ammonium tungstate as a starting material with a carbon powder to form a slurry, drying the slurry to form a precursor mixed with the carbon powder, heating the mixed precursor in a non-oxidizing gas atmosphere, thereby causing the reduction and carburization by means of the carbon powder in the mixed precursor to produce a reduced and carburized product composed mainly of tungsten carbide, and finally mixing the reduced and carburized product with the similar carbon powder used in the preparation of the slurry in a proportion so that W:C is substantially 1:1, and subjecting the mixture to a carburization in a hydrogen atmosphere, it becomes possible to form a high-purity, fine and high-performance tungsten carbide powder which contains less metal impurities and less coarse WC particles, and which also contains oxygen and, in a case, nitrogen in trace amounts.

(d) The cemented carbide produced by using, as a raw powder, the fine tungsten carbide powder obtained in (c) above has a higher strength as compared with a cemented carbide produced by using a fine tungsten carbide powder having an average particle size of 0.8 $\mu$m or less produced by a conventional process, or a composite powder of a fine tungsten carbide particle and cobalt having an average particle size of 0.8 $\mu$m or less. When used as a cutting tool and a wear-resistant tool, it exhibits superior performance without causing breakage and chipping of the edge portion.

The present invention has been made based on the research results described above and is directed to a process for producing a fine tungsten carbide powder, which comprises the steps (a) to (e) of:

(a) mixing an aqueous ammonium tungstate solution (an aqueous solution of at least one of ammonium metatungstate and ammonium paratungstate, preferably in a concentration within a range of 20–70% by weight) preferably having a purity of at least 99.9% by weight, and more preferably at least 99.99% by weight, with a carbon powder (preferably carbon black powder) preferably having a purity of at least 99.9% by weight, and more preferably at least 99.99% by weight, in a proportion required to reduce and carburize ammonium tungstate (preferably an atomic ratio of carbon to tungsten in ammonium tungstate (C/W) in a range of 3–4) to form a slurry, (b) drying the slurry at low temperature (preferably not more than 350° C.) to prepare a precursor, (c) subjecting the precursor to a reduction and carburization by heating to a temperature, at which a reduction and carburization proceed (preferably within a range of 900–1600° C. and more preferably within a range of 1000–1200° C.), in a non-oxidizing gas atmosphere (preferably in a mixed gas of a nitrogen gas at normal pressure and a CO gas produced by the reaction) to form a reduced and carburized product, which is substantially free of oxides, (d) mixing the reduced and carburized product with a carbon powder (preferably carbon black powder) preferably having a purity of at least 99.9% by weight, and more preferably at least 99.99% by weight, in a proportion required to carburize a $W_2C$ component and/or a W component in the reduced and carburized product into WC, and (e) subjecting the reduced and carburized product mixed with the carbon powder to a carburization by heating to a temperature, at which a carburization proceeds (preferably within a range of 900–1600° C., and more preferably within a range of 1000–1400° C.), in a hydrogen atmosphere, thus producing a fine tungsten carbide powder having an average particle size of 0.8 μm or less, and to a high-performance fine tungsten carbide powder produced by the process.

The process of the present invention can provide a high-purity fine tungsten carbide powder capable of producing a high-strength cemented carbide, and thus it contributes to an increase in strength of various cutting tools and wear-resistant tools in which the cemented carbide is widely used.

DETAILED DESCRIPTION OF THE INVENTION

The reason why manufacturing conditions were decided as described above in the process of the present invention will be explained.

(a) Kind and Purity of Raw Materials

Ammonium tungstate includes ammonium metatungstate and ammonium paratungstate. Both of these can be used as a raw material, but ammonium metatungstate has a higher solubility in water at room temperature. Therefore, when using ammonium paratungstate, warm water at a proper temperature is used, if necessary. To obtain high-purity WC, the purity (content of tungsten in the total metal component) must be controlled to at least 99.9% by weight, and preferably at least 99.99% by weight.

Since the carbon powder must be finely dispersed in the aqueous ammonium tungstate solution as much as possible, a carbon black powder is preferred to obtain a fine powder. For the same reason as in the case of ammonium tungstate, the purity is preferably at least 99.9% by weight, and more preferably at least 99.99% by weight.

The process of the present invention does not require any mechanical milling step and therefore contamination by metal impurities from the milling step can be avoided, thus making it possible to produce a high-purity tungsten carbide powder.

(b) Content of Ammonium Tungstate in Aqueous Solution

Even if the content is less than 20% by weight and exceeds 70% by weight, it becomes difficult to obtain a slurry containing a carbon powder dispersed uniformly therein. Therefore, the content is preferably within a range of 20–70% by weight.

(c) Content of Carbon Powder in Slurry

When the atomic ratio of carbon to tungsten in ammonium tungstate (C/W) is less than 3, oxides remain in the reduced and carburized product. When oxides exist in the reduced and carburized product, the oxide reacts with hydrogen in the atmosphere in the following step of carburizing with heating to form $H_2O$, which promotes grain growth of the tungsten carbide powder. Therefore, the average particle size increases to produce WC particles wherein grain growth locally occurs. On the other hand, when the content exceeds 4, the content of free carbon in the reduced and carburized product increases. Therefore, the content is preferably within a range of 3–4.

(d) Drying Temperature

The slurry is dried by a simple heating process in air, or by a spray-dry process. When the heating temperature exceeds 350° C., tungsten oxide produced by the decomposition of ammonium tungstate causes grain growth, thus making it difficult to form a fine reduced and carburized product. Therefore, the heating temperature is preferably 350° C. or less.

(e) Temperatures of Reduction and Carburization Treatment and Carburization Treatment When each temperature is lower than 900° C., the reduction and the carburization cannot proceed sufficiently. On the other hand, when each temperature exceeds 1600° C., the grain rapidly grows in both reactions, thus making it impossible to control the average particle size to 0.8 μm or less. In both cases, the temperature is preferably within a range of 900–1600° C. In consideration of the economical reduction and carburization time and the degree of grain growth of the respective reaction products, the reduction and carburization temperature and the carburization temperature are more preferably within a range of 1000–1200° C. and 1000–1400° C., respectively.

(f) Average Size of WC Particles

In general, the cemented carbide produced by using a WC powder having a small average particle size as a raw material has a higher strength. Therefore, in the tungsten carbide powder for the objective fine alloy of the present invention, the average particle size of WC particles is preferably controlled to 0.8 μm or less.

(g) Maximum Size of WC Particles

Even if the cemented carbide is produced by using a fine tungsten carbide powder having an average particle size of 0.8 μm or less as a raw material, coarse WC particles included in the cemented carbide act as the origins of fractures, thereby causing reduction in strength. In the desired fine alloy of the present invention, the maximum particle diameter of WC particles is preferably controlled to 1 μm. As the average particle size of powders, the Fischer Subsieve Sizer (FSSS) process is familar. However, for the fine powder, a value converted from the specific surface area in accordance with the BET process or a value measured by SEM is (h) Content of Nitrogen and Oxygen in WC Regarding the WC powder produced by the process of the present invention, only a WC phase is observed by X-ray diffraction. When treated in an atmosphere containing nitrogen at normal pressure during the reduction and carburization, the resulting product contains a trace amount of nitrogen without being treated in nitrogen under pressure. Also after the completion of the carburization, a trace amount of oxygen remains. These components inhibit sintering during the production of the cemented carbide and also have an operation of inhibiting grain growth. Therefore, the nitrogen content is preferably within a range of 0.05–0.30% by weight, and preferably within a range of 0.08–0.20% by weight, while the oxygen content is preferably within a range of 0.10–0.60% by weight, and more preferably from 0.10–0.35% by weight. The nitrogen content and the oxygen content can achieve the desired content by controlling the heating conditions of the reduction and carburization and those of the carburization. These nitrogen and oxygen components are those which exist in the crystal lattice. Because of the existence of nitrogen and oxygen in the content within the above range, the WC powder has a lattice constant of 0.29020–0.29060 nm for the a-axis and that of 0.28380–0.28420 nm for the c-axis, unlike the standard value in accordance with Joint Committee of Powder Diffraction Standard (JCPDS) (25-1047).

EXAMPLES

Using ammonium metatungstate (AMT) and ammonium paratungstate (APT) each having a purity shown in Table 1 (percentages are by weight unless otherwise specified), pure water was added to prepare aqueous solutions each having a predetermined concentration within a range of 20–70% by weight. To each of these aqueous solutions of various concentrations, a carbon black (CB) having a purity shown in Table 1 was added in the proportion (atomic ratio of C to W) shown in Table 1, followed by mixing using a stirrer for one hour to form a slurry. Among these slurries, the slurry having a concentration within a range of 20–45% by weight is spray-dried using a spray-dryer (heating temperature set to 300° C.), while the aqueous 50–70 wt % solution was heated at low temperature using a hot-air (heating temperature set to 150° C.) to prepare mixed precursors of AMT or APT and the CB powder.

Then, the resulting mixed precursors were subjected to the reduction and carburization using a fixed bed furnace in a nitrogen gas atmosphere under 1 atmosphere pressure under the conditions of a predetermined temperature within a range of 900–1600° C. for one hour (the same conditions may be used even when using a horizontal type rotary furnace).

The qualitative analysis of the reduced and carburized products formed by the reduction and carburization was conducted by X-ray diffraction. As a result, it has been confirmed that all reduced and carburized products are mainly composed of WC and are substantially free of oxides.

Subsequently, a CB powder which is the same as that added to the above aqueous solutions of ammonium tungstates was add to the above reduction and carburization products in the proportions shown in Table 1 (which are proportions required to substantially carburize $W_2C$ and W in the reduced and carburized products into WC in the composition formula and denotes a proportion of the content to the total amount of the reduced and carburized products). After mixing using a stirrer, the mixture was subjected to a carburization using the same fixed bed furnace (a horizontal type rotary furnace may be used) in a hydrogen gas atmosphere under 1 atmosphere pressure under the conditions of a predetermined temperature within a range of 900–1600° C. for 0.5–1 hours, thereby carrying out the processes 1 to 15 of the present invention.

With respect to the carburized products obtained by the processes 1 to 15 of the present invention, X-ray diffraction was conducted. As a result, only diffraction lines of WC were observed. Using six diffraction lines of (001), (100), (110), (111), (211) and (300) among these diffraction lines, lattice constants of an a-axis and a c-axis were determined.

The average particle size was determined by the Fischer Subsieve Sizer (FSSS) process and the specific surface area due to the BET process was also determined. The content of nitrogen and that of oxygen in the products were measured by using a nitrogen and oxygen analyzing apparatus manufactured by the LECO Co. To eliminate an influence of adsorbed oxygen, the powder was heat-treated in a hydrogen gas atmosphere at 800° C. prior to the measurement. The content of W in the total metal component and the content of free carbon were measured. As is apparent from the results shown in Table 2, all tungsten carbide powders thus obtained are high-purity fine tungsten carbide powders, which contain a metal component having a purity of at least 99.9% by weight, 0.05–0.30% by weight of nitrogen, 0.1–0.6% by weight of oxygen and has an average particle size of 0.8 μm or less and a maximum particle size of 1 μm or less, and some tungsten carbide powder contains traces of free carbon.

For the purpose of examining the influence of the high-purity fine tungsten carbide powders obtained by the processes 1–15 of the present invention on the strength of the cemented carbide, using the high-purity fine tungsten carbide powders obtained by the processes 2, 5, 8, 11 and 14 among the processes 1–15 of the present invention, commercially available fine tungsten carbide powders having an average particle size and a purity shown in Table 3, the chromium carbide (represented by $Cr_3C_2$) powder having an average particle size of 1.51 μm, the vanadium carbide (represented by VC) powder having an average particle size of 1.43 μm and the Co powder having an average particle size of 1.35 μm, these raw powders were charged in accordance with the formulation shown in Table 3, wet-milled using an attritor, dried, and then compacted to form a green compact having a size of 10.8 mm×6 mm×30 mm under a pressure of 98 MPa. The resulting green compact was sintered under vacuum of 13.3 Pa under the conditions of a temperature of 1360° C. for one hour, and was then subjected to an HIP (Hot Isostatic Press) in an Ar atmosphere under a pressure of 90 MPa under the conditions of a temperature of 1320° C. for one hour to produce cemented carbides 1–5 of the present invention and comparative cemented carbide 1–5, respectively. The strength was evaluated by measuring the transverse rupture strength of these cemented carbides.

As is apparent from the results shown in Table 3, all alloys using the high-purity fine tungsten carbide powder obtained by the process of the present invention have a higher strength than that of alloys using commercially available fine tungsten carbide powders.

As is apparent from the results shown in Table 2 and Table 3, according to the processes 1–15 of the present invention, it is possible to produce high-purity fine tungsten carbide powders which have a high purity of at least 99.9% by weight and also have an average particle size of 0.8 μm or less and a maximum particle size of 1 μm or less. Also the cemented carbides 1–5 of the present invention produced by using these high-purity fine tungsten carbide powders have a small particle size of 0.8 μm or less on average particle size, but have a higher strength than that of comparative cemented carbides 1–5 produced by commercially available fine tungsten carbide powders containing coarse WC particles having a purity of 98% by weight or less or a particle size of 1 μm or less.

TABLE 1

| | Formulation of slurry (% by weight) | | | | | | | | |
|---|---|---|---|---|---|---|---|---|---|
| | AMT | | APT | | CB powder | | Reduction and | Ratio of CB powder to reduced and | Carburization |
| Class | Purity (% by weight) | Concentration of aqueous solution (% by weight) | Purity (% by weight) | Concentration of aqueous solution (% by weight) | Purity (% by weight) | C/W ratio | carburization temperature (°C.) | carburized product (% by weight) | temperature (°C.) |
| Process of the present invention | | | | | | | | | |
| 1 | 99.915 | 35 | — | — | 99.913 | 3.9 | 900 | 0.09 | 1200 |
| 2 | 99.952 | 35 | — | — | 99.955 | 3.5 | 1000 | 0.23 | 1200 |
| 3 | 99.977 | 35 | — | — | 99.972 | 3.3 | 1300 | 0.42 | 1600 |
| 4 | — | — | 99.911 | 20 | 99.915 | 3.7 | 1100 | 0.14 | 1100 |
| 5 | — | — | 99.956 | 20 | 99.954 | 3.5 | 1100 | 0.21 | 1300 |
| 6 | — | — | 99.975 | 20 | 99.975 | 3.2 | 1100 | 0.37 | 1200 |
| 7 | 99.995 | 20 | — | — | 99.993 | 4.0 | 900 | 0.05 | 900 |
| 8 | 99.995 | 35 | — | — | 99.993 | 3.3 | 1000 | 0.17 | 1100 |
| 9 | 99.995 | 50 | — | — | 99.993 | 3.6 | 1100 | 0.28 | 1000 |
| 10 | 99.995 | 60 | — | — | 99.993 | 3.2 | 1300 | 0.43 | 1300 |
| 11 | 99.995 | 70 | — | — | 99.993 | 3.0 | 1400 | 0.48 | 1400 |
| 12 | — | — | 99.996 | 20 | 99.997 | 3.2 | 1000 | 0.11 | 1400 |
| 13 | — | — | 99.996 | 20 | 99.997 | 3.2 | 1200 | 0.26 | 1200 |
| 14 | — | — | 99.996 | 20 | 99.997 | 3.5 | 1200 | 0.32 | 1300 |
| 15 | — | — | 99.996 | 20 | 99.997 | 3.3 | 1600 | 0.36 | 950 |

TABLE 2

| Class | Average particle size ($\mu$m) | Maximum particles size ($\mu$m) | Specific surface area (m$^2$/g) | W content in entire metal component (% by weight) | Nitrogen content (% by weight) | Oxygen content (% by weight) | Free carbon content (% by weight) | Lattice constant (nm) a-axis | Lattice constant (nm) c-axis |
|---|---|---|---|---|---|---|---|---|---|
| Process of the present invention | | | | | | | | | |
| 1 | 0.35 | 0.7 | 3.82 | 99.913 | 0.25 | 0.52 | 0.04 | 0.29030 | 0.28413 |
| 2 | 0.37 | 0.8 | 3.47 | 99.954 | 0.20 | 0.49 | 0.01 | 0.29035 | 0.28403 |
| 3 | 0.41 | 1.0 | 2.93 | 99.977 | 0.05 | 0.18 | 0.02 | 0.29060 | 0.28381 |
| 4 | 0.33 | 0.8 | 4.24 | 99.914 | 0.20 | 0.54 | 0.03 | 0.29034 | 0.28406 |
| 5 | 0.38 | 0.8 | 3.55 | 99.955 | 0.14 | 0.38 | 0.00 | 0.29047 | 0.28394 |
| 6 | 0.40 | 0.8 | 3.01 | 99.972 | 0.13 | 0.21 | 0.04 | 0.29047 | 0.28393 |
| 7 | 0.31 | 0.7 | 4.15 | 99.996 | 0.25 | 0.60 | 0.08 | 0.29028 | 0.28412 |
| 8 | 0.36 | 0.8 | 3.85 | 99.994 | 0.28 | 0.55 | 0.04 | 0.29024 | 0.28417 |
| 9 | 0.39 | 0.8 | 3.50 | 99.995 | 0.15 | 0.36 | 0.05 | 0.29044 | 0.28396 |
| 10 | 0.40 | 0.9 | 3.18 | 99.995 | 0.12 | 0.30 | 0.00 | 0.29050 | 0.28392 |
| 11 | 0.55 | 1.0 | 2.24 | 99.994 | 0.05 | 0.16 | 0.00 | 0.29060 | 0.28381 |
| 12 | 0.45 | 0.8 | 2.89 | 99.995 | 0.21 | 0.57 | 0.05 | 0.29036 | 0.28406 |
| 13 | 0.66 | 0.8 | 1.97 | 99.997 | 0.17 | 0.43 | 0.03 | 0.29041 | 0.28398 |
| 14 | 0.75 | 0.9 | 1.56 | 99.995 | 0.14 | 0.18 | 0.01 | 0.29045 | 0.28394 |
| 15 | 0.78 | 1.0 | 1.42 | 99.993 | 0.05 | 0.10 | 0.00 | 0.29059 | 0.28380 |

TABLE 3

| | Formulation (% by weight) | | | | WC | | | | Transverse |
|---|---|---|---|---|---|---|---|---|---|
| Class | Co | Cr$_3$C$_2$ | VC | W content in entire metal component, excluding Co (% by weight) | Average particle size ($\mu$m) | Maximum particle size ($\mu$m) | Specific surface area (m$^2$/g) | Amount | rupture strength (GPa) |
| Cemented carbide of the present invention | | | | | | | | | |
| 1 | 10 | 0.8 | — | Products of process 2 of the present invention | | | | bals. | 4.10 |
| 2 | 10 | 0.5 | 0.4 | Products of process 5 of the present invention | | | | bals. | 4.31 |
| 3 | 10 | — | 0.4 | Products of process 8 of the present invention | | | | bals. | 4.05 |
| 4 | 10 | 0.8 | — | Products of process 11 of the present invention | | | | bals. | 4.19 |
| 5 | 10 | 0.5 | 0.4 | Products of process 14 of the present invention | | | | bals. | 4.27 |

TABLE 3-continued

| | | | | Formulation (% by weight) | | | | | |
|---|---|---|---|---|---|---|---|---|---|
| | | | | | WC | | | | Transverse |
| Class | Co | $Cr_3C_2$ | VC | W content in entire metal component, excluding Co (% by weight) | Average particle size ($\mu$m) | Maximum particle size ($\mu$m) | Specific surface area ($m^2/g$) | Amount | rupture strength (GPa) |
| Comparative cemented carbide | | | | | | | | | |
| 1 | 10 | 0.8 | — | 97.788* | 0.37 | 0.8 | 3.50 | bals. | 3.06 |
| 2 | 10 | 0.5 | 0.4 | 97.754* | 0.51 | 0.9 | 2.32 | bals. | 3.22 |
| 3 | 10 | — | 0.4 | 97.660* | 0.75 | 1.5* | 1.56 | bals. | 3.14 |
| 4 | — | 0.8 | — | WC-10 wt % Co composite powder: 99.922 | 0.44 | 2.9* | 3.09 | bals. | 2.98 |
| 5 | — | 0.5 | 0.4 | WC-10 wt % Co composite powder: 99.956 | 0.62 | 2.1* | 1.88 | bals. | 2.67 |

Asterisks (*) denote numerical values outside the scope of the present invention.

What is claimed is:

1. A process for producing a tungsten carbide powder, comprising the steps of:
   (a) mixing an aqueous ammonium tungstate solution with a carbon powder in a proportion to reduce and carburize ammonium tungstate to form a slurry,
   (b) drying the slurry to prepare a precursor,
   (c) subjecting the precursor to a reduction and carburization by heating to a temperature, at which a reduction and carburization proceeds, in a non-oxidizing gas atmosphere to form a reduced and carburized product,
   (d) mixing the reduced and carburized product with a carbon powder in a proportion required to carburize a $W_2C$ component and/or a W component in the reduced and carburized product into WC, and
   (e) subjecting the reduced and carburized product mixed with the carbon powder to a carburization by heating to a temperature, at which a carburization proceeds, in a hydrogen atmosphere,
   wherein an amount of the carbon (C) powder in step (a) with respect to the tungsten (W) component in ammonium tungstate by atomic ratio C/W is within a range of 3–4.

2. A process for producing a tungsten carbide powder according to claim 1, wherein the ammonium tungstate in step (a) is at least one of ammonium metatungstate and ammonium paratungstate.

3. A process for producing a tungsten carbide powder according to claim 1, wherein the ammonium tungstate in step (a) comprises a purity of at least 99.9% by weight based on the content of tungsten in the total metal component of said solution.

4. A process for producing a tungsten carbide powder according to claim 3, wherein the ammonium tungstate in step (a) comprises a purity of at least 99.99% by weight based on the content of tungsten in the total metal component of said solution.

5. A process for producing a tungsten carbide powder according to claim 1, wherein a concentration of the aqueous ammonium tungstate solution in step (a) is within a range of 20–70% by weight.

6. A process for producing a tungsten carbide powder according to claim 1, wherein each carbon powder in step (a) and step (d) is a carbon black powder having a purity of at least 99.9% by weight.

7. A process for producing a tungsten carbide powder according to claim 6, wherein each carbon powder in step (a) and step (d) is a carbon black powder having a purity of at least 99.99% by weight.

8. A process for producing a tungsten carbide powder according to claim 1, wherein the slurry in step (b) is dried at a drying temperature of not more than 350° C.

9. A process for producing a tungsten carbide powder according to claim 1, wherein the non-oxidizing gas atmosphere of the reduction and carburization in step (c) is a mixed gas which substantially comprises nitrogen gas at normal pressure and CO gas, said CO gas being produced by the reduction and carburization of the precursor.

10. A process for producing a tungsten carbide powder according to claim 1, wherein the temperature of the reduction and carburization in step (c) is within a range of 900–1600° C.

11. A process for producing a tungsten carbide powder according to claim 10, wherein the temperature of the reduction and carburization in step (c) is within a range of 1000–1200° C.

12. A process for producing a tungsten carbide powder according to claim 1, wherein the temperature of the carburization in step (e) is within a range of 900–1600° C.

13. A process for producing a tungsten carbide powder according to claim 12, wherein the temperature of the carburization in step (e) is within a range of 1000–1400° C.

* * * * *